United States Patent [19]
Schuster et al.

[11] 4,344,744
[45] Aug. 17, 1982

[54] SPRAY PUMP

[75] Inventors: Wilhelm Schuster; Jürgen Stahl, both of Frankfurt am Main, Fed. Rep. of Germany

[73] Assignee: Pfeiffer Zerstäubervertriebsgesellschaft mbH & Co. KG, Fed. Rep. of Germany

[21] Appl. No.: 112,678

[22] Filed: Jan. 16, 1980

[30] Foreign Application Priority Data

Jan. 24, 1979 [DE] Fed. Rep. of Germany ....... 2902624

[51] Int. Cl.[3] ....................... F04B 21/04; G01F 11/02
[52] U.S. Cl. .................................... 417/550; 417/554; 222/321
[58] Field of Search ................ 417/550, 554; 137/853; 222/321, 341

[56] References Cited

U.S. PATENT DOCUMENTS

| | | | |
|---|---|---|---|
| 2,598,122 | 5/1952 | Hansen | 137/853 |
| 3,062,416 | 11/1962 | Cooprider | 222/341 |
| 3,228,570 | 1/1966 | Steiman | 222/321 |
| 3,954,354 | 5/1976 | Bori | 417/550 |
| 4,065,038 | 12/1977 | Magers et al. | 222/341 |

FOREIGN PATENT DOCUMENTS

| | | | |
|---|---|---|---|
| 1015363 | 12/1957 | Fed. Rep. of Germany . | |
| 1949181 | 8/1970 | Fed. Rep. of Germany . | |
| 1302372 | 6/1978 | Fed. Rep. of Germany . | |
| 58944 | 5/1965 | German Democratic Rep. . | |
| 1189592 | 4/1970 | United Kingdom | 417/550 |
| 1215432 | 12/1970 | United Kingdom | 417/550 |
| 1266229 | 3/1972 | United Kingdom | 417/550 |

*Primary Examiner*—William L. Freeh
*Attorney, Agent, or Firm*—Steele, Gould & Fried

[57] ABSTRACT

A spray pump comprises a pump cylinder defining a pump chamber, a piston which is movable in the chamber, an actuating push button arranged to move the piston in the chamber, and an atomization nozzle arranged to receive liquid from the said chamber. A liquid outlet valve is located between the pump chamber and the atomization nozzle. The outlet valve comprises a valve body received in and surrounded by a tubular portion, the valve having a closed position in which tubular portion lies against the valve body and an open position in which the tubular portion is elastically widened to allow liquid to pass between the valve body and the tubular portion. The valve further comprising a stop for holding the valve body in the tubular portion.

14 Claims, 4 Drawing Figures

SPRAY PUMP

FIELD OF THE INVENTION

The invention relates to a spray or atomisation pump having a pump cylinder defining a pump chamber and a piston which moves therein and which can be pressed into the pump cylinder by means of an actuating push button. A liquid outlet valve having a valve body is positioned between the pump chamber and an atomisation or spray nozzle, the outlet valve having a portion which can be widened elastically to its opening and lies against the valve body.

BACKGROUND OF THE INVENTION

A spray pump has been described in German Democratic Republic Patent No. 58 944, in which the outlet valve is formed by a spherical valve body which is fixed on a long rod at the end of a piston sleeve. The piston sleeve rests against the valve body at its end remote from the pump chamber. The piston sleeve which is bowl-shaped at the pump chamber end is biased by the restoring spring of the pump and opens under the influence of the pressure of this spring and the liquid pressure by being lifted from the valve body. The piston sleeve applies a strong axial force on the valve body which consequently has to be mounted firmly on the rod. This is a difficult construction to produce. In order to mount the rod, the piston has to be designed in two parts. Moreover, the opening behaviour of this valve is not ideal since the opening force increases toward the end of the stroke due to the increasing spring force. Difficulties can therefore arise during closure of the valve at the end of the stroke.

A piston pump has also been described in German Pat. No. 13 02 372 in which the piston has a thin-walled neck which is axially compressed under the influence of the liquid pressure so that it opens the liquid valve. The valve body is rigidly mounted on a hollow piston rod. A spring force acts on the valve body so that the valve is opened only by the liquid pressure. This design operates quite satisfactorily with high reliability. However, it would be desirable to improve this spray pump by further simplifying production and mounting. In the known spray pump, for example, the initial closing force to which the resilient neck subjects the valve has to be maintained during production and mounting.

SUMMARY OF THE INVENTION

The object of the present invention is to provide a spray pump of the type mentioned above in which the operation of the outlet valve is improved while allowing simple production and mounting.

According to the invention there is provided a spray pump comprising a pump cylinder defining a pump chamber, a piston which is movable in the said chamber, an actuating push button arranged to move the said piston in the said chamber, an atomisation nozzle arranged to receive liquid from the said chamber, and a liquid outlet valve located between the pump chamber and the atomisation nozzle, the outlet valve comprising a valve body received in and surrounded by a tubular portion, the valve having a closed position in which the said tubular portion lies against the valve body, and an open position in which the tubular portion is elastically widened to allow liquid to pass between the valve body and the tubular portion, the valve further comprising a stop for holding the valve body in the tubular portion.

The tubular portion surrounds the valve body in such a way that it is not normally exposed to longitudinal forces. The valve body can therefore be a loose member which is fixed by being pressed into the tubular portion. The stop merely needs to restrict the movability of the valve body in the outlet direction so that it is not entrained in the conveying direction when the valve is opened. It does not need to be fixed in the opposite direction and only needs to be provided for protection. This valve opens under liquid pressure by the widening of the tubular portion so that the liquid can flow past the valve body. Even if a spring bears on the valve body, as it does according to one embodiment of the invention, and thus prevents it from falling out, the spring does not influence the opening behavior of the valve. The closing force is therefore equally large at the end of the stroke as at the beginning of the stroke.

The tubular widenable portion preferably bears against the valve body with an initial tension. This ensures that the valve only opens when a sufficiently high pressure is built, thus ensuring good atomisation. However, a certain hysteresis in the opening and closing behavior is preferably ensured by arranging for the widenable portion to transmit a force between the actuating push button and the piston. This ensures more satisfactorily that the valve closes again immediately after opening when the pressure in the pump chamber drops somewhat due to the issue of liquid to the atomisation nozzle. This could otherwise cause fluttering of the valve. In particular, when the widenable portion transfers the axial pressing force caused by the liquid pressure, it ensures a slight but adequate amount of hysteresis between the opening and closing of the valve.

The valve body can have any desired shape, for example could be spindle-shaped or the like in design. However, it preferably has an arcuate circumferential face which causes uniform bulging in the widenable portion. For example, the valve body can be a sphere to simplify production and mounting.

The widenable portion can be an integral part of a piston which is hollow in design, and the valve body can be arranged inside the piston cavity. With this design, only one single-part piston is needed, and the piston can be produced from a resilient material, this being advantageous not only for the operation of the valve but also for the operation of the piston sealing lips. Moreover, the piston which is normally of a thick-walled design can be designed to have thinner walls in the region of the tube portion.

The design according to the invention also advantageously allows the outlet valve to be arranged relatively close to the atomisation nozzle, and this improves the atomisation behaviour.

Other advantages and features of the invention are disclosed in the sub-claims and the description in conjunction with the drawings. Embodiments of the invention are illustrated in the drawings and described in more detail below.

DETAILED DESCRIPTION OF ILLUSTRATED EMBODIMENTS

Figure 1:
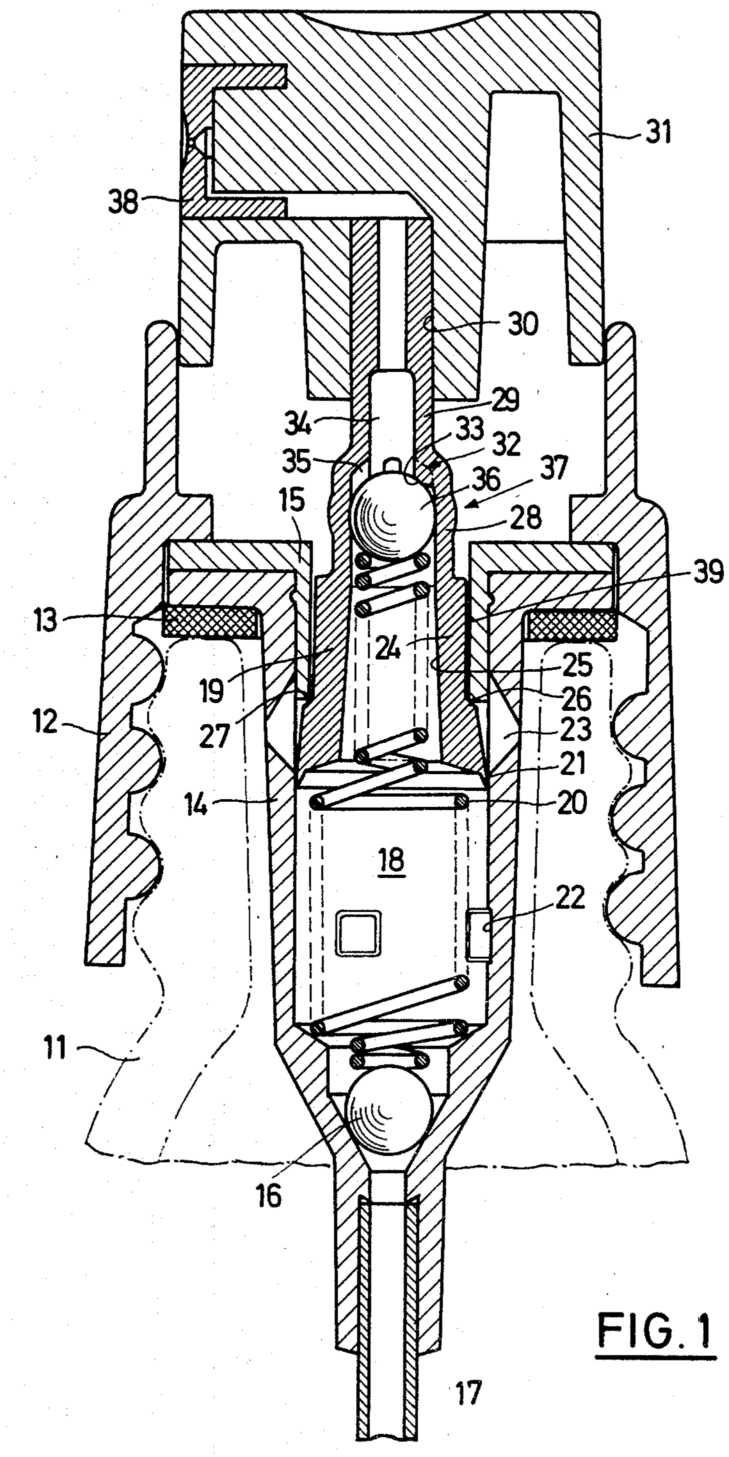
FIG. 1 shows a longitudinal section through a spray piston pump according to a preferred embodiment.

The pump shown on a magnified scale in FIG. 1 is intended to be screwed on a container 11 indicated in part by dot-dash lines, which can contain the liquid to be sprayed or atomised, such as perfume, or a medical, cosmetic or other liquid. The pump is screwed onto the container by means of a screw cap 12 which, in the manner of a union nut, presses a seal 13, the upper flange of a pump cylinder 14 and a sealing sleeve 15 against the rim of the opening of the container and thus secures it.

The piston pump is designed as a simple action reciprocating piston pump and has at the lower end of the pump cylinder a cylinder sealing cover moulded onto it which has a valve ball forming a suction valve 16 in an angular recess. A connecting nozzle, in which a suction tube 17 extending into the liquid is fixed, is joined to the valve cover.

The pump has a chamber 18 in which a piston 19 is guided axially against the force of a restoring spring 20. Like most parts of the pump, it is produced from a plastic material, but the plastic material used in this case must be a readily resilient material. The piston 19 has encircling sealing lips 21 at its lower end which form a seal with the pump cylinder wall, thereby defining the upper end of the pump chamber 18. A plurality of recesses 22, which produce an intentional leak in the sealing lips just before the end of the stroke is reached and thus suddenly reduce the liquid pressure, are distributed over the periphery of the pump cylinder wall.

Ventilation passages 23 which communicate the upper part of the pump cylinder with the interior of the container are provided in the pump cylinder wall above the region covered by the sealing lips 21.

The piston is hollow in design and its lower portion 24 is of a relatively thick-walled design, for example in the region in which it penetrates into the pump cylinder 14, but leaves free a large central cavity 25. In its lower region, the piston has on its exterior a slightly frustoconical portion which is bounded by the sealing lips 21 and a tapered ledge 26, which, when the pump is not in use rests against a sealing edge 27 of the sealing sleeve 15 which penetrates the pump cylinder from above and is fixed by a snap connection.

The external diameter of the piston is reduced above the piston portion 24, producing a thinner walled tubular portion 28 which, although made of the elastic piston material, does have sufficient rigidity to transmit an axial pressing force acting on the piston. This portion 28 passes into a piston shaft 29 which is further reduced in diameter and which is fixed by force-fitting in an opening 30 in an actuating push button 31 of the piston pump. The piston shaft also has a thicker wall in the force-fitted portion.

The transition between the thin-walled portion 28 and the adjacent thin-walled portion of the piston shaft (before the thicker-walled force-fitted portion) defines a stop 32 in the form of a shoulder 33 which is designed in the form of a universal ball-joint and forms a sealing ledge for the piston cavity 24 which passes into a thinner central opening 34 of the piston at that point. A plurality of liquid ducts 35 penetrating the shoulders are provided in the shoulder region.

In the portion 28 is arranged a valve body 36 in the form of a ball of a somewhat larger diameter than the cavity 35 in this region. It is pressed in from the free lower piston face through the cavity 25 and widens the elastic portion 28 somewhat which thus rests against the outer periphery of the ball. The material of this portion thus contains the ball in a region somewhat above and below what may be regarded as the "equator" of the ball, so that the ball is fixed and does not tend to move in either direction. The valve body 36 is pressed in until it rests against the stop 32 formed by the shoulder 33. It is held in this position by the compression spring 20 which has a portion of a smaller diameter which penetrates into the piston cavity 25 and rests against the underside of the ball.

The liquid outlet valve 37 formed by the valve body 36 and the widenable portion 28 lies quite close to where the piston is held in the actuating push button and above the actual piston region. It is thus arranged relatively close to the spray or atomisation nozzle 38 provided in the actuating push button.

The atomiser piston pump shown in FIG. 1 operates as follows. The pump is actuated by pressing down the actuating push button 31. The piston performs its stroke between the position illustrated in FIG. 1 and a position which is limited by the stop between actuating push button 31 and a stop face on the screw cap 12. While the pump chamber is still filled with air, it is initially compressed only moderately due to the relatively large dead space so that the liquid outlet valve 37 cannot yet open against the initial biasing force. However, at the end of the stroke the compressed air is let out of the pump chamber via the recesses 22 (which could also be designed as corresponding projections). A suction which sucks liquid through the suction tube 17 and the inlet valve 16 is thus produced during the return stroke of the piston. Once the pump chamber has filled in this way and during the actuating stroke, the incompressible liquid builds up a high liquid pressure in the pump chamber 18 and opens the liquid outlet valve 37, portion 28 widening so that liquid can flow through between the valve body 36 and the wall of the portion 28 adjacent to it, and thence through the liquid ducts 35 and the central opening 34 to the nozzle 38 where finely atomised liquid issues. During the opening of the valve, the valve body is freed at least partially over its periphery but it kept in its position (pressed on the stop 32) by the compression spring 20. Axial movement does not normally take place in outlet valve 37. The operation of the valve would not be impaired if the valve body were to move axially in the region of the thin-walled portion 28 (see FIGS. 2 and 3).

During the working stroke, the liquid pressure which is substantially constant after the beginning of atomisation as well as the frictional pressure which is also constant and the pressure of the restoring spring 20 are overcome by finger pressure on the actuating head 31. The liquid pressure and the frictional pressure also act on the portion 28 while the spring pressure is transferred via the valve body direction onto the piston shaft 29. The widening results in bulging of the portion 28 which is prevented at least slightly by the axial pressure counteracting the liquid and frictional pressure. This means that the liquid pressure has to be somewhat higher to open the valve than the pressure which allows the valve to close. This hysteresis in the opening and closing behaviour of the outlet valve counteracts a possible fluttering tendency of the valve which could arise if there were a slight pressure drop in the cylinder after the opening of the valve and the issue of the first liquid. Temporally interrupted atomisation would occur and would increase the risk of individual droplets which were not fully atomised being formed, which could form spots on sensitive materials, for example in the case of perfume, and, more seriously, reduces the effectiveness in medical applications. It should be noted that this hysteresis remains constant over the entire length of the stroke as the spring force does not act on the portion 28.

For the sprayed liquid, air penetrates through a liquid path 39 during the working stroke and can pass between the internal wall of the sealing sleeve 15 and the external wall of the piston once the ledge 26 of the piston has lifted from the sealing edge 27 of the sealing sleeve 15. This compensating air can then penetrate through the ventilation passages 23 into the container. In the rest position, however, this air compensating path 39 is sealed by the ledge 26 and edge 27.

At the end of the working stroke, the sealing lips 21 reach the recesses 22 and the liquid under pressure in the pump chamber can suddenly flow past the sealing lip 21 and is later recirculated into the container through the ventilation passages 23 which have a double function in this respect. The outlet valve 37 is also closed suddenly by the sudden drop in pressure because the liquid pressure widening the portion 28 is removed. This valve operates with a particularly small amount of inertia and thus extremely quickly. The speed of the pressure drop and the valve closure is important because the liquid supply to the atomiser nozzle is cut off by it, and a slow pressure drop could lead to a closing phase in which there was poor atomisation and droplet formation.

Figure 2:
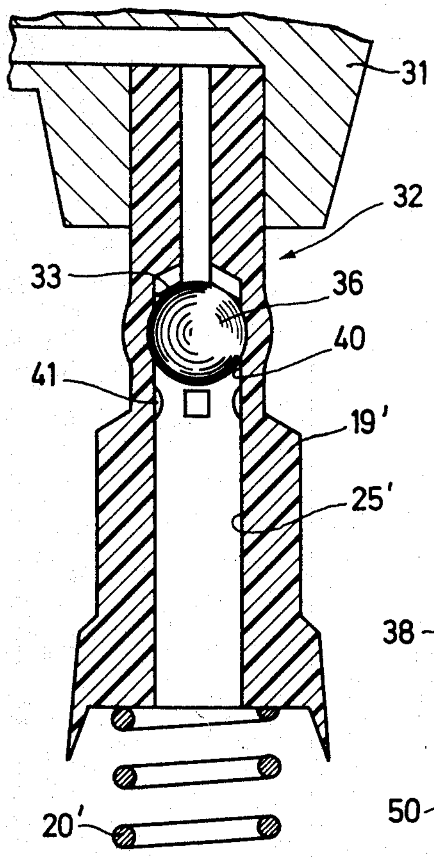
FIGS. 2 and 3 show the piston and the actuating push button (in part) according to modified embodiments, also in a longitudinal section.
Figure 4:
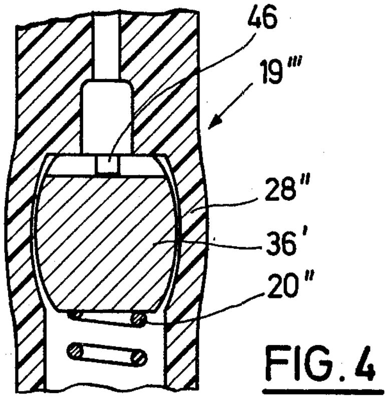
FIG 4 shows a longitudinal section through a detail of the pump shaft of another embodiment.
Figure 3:
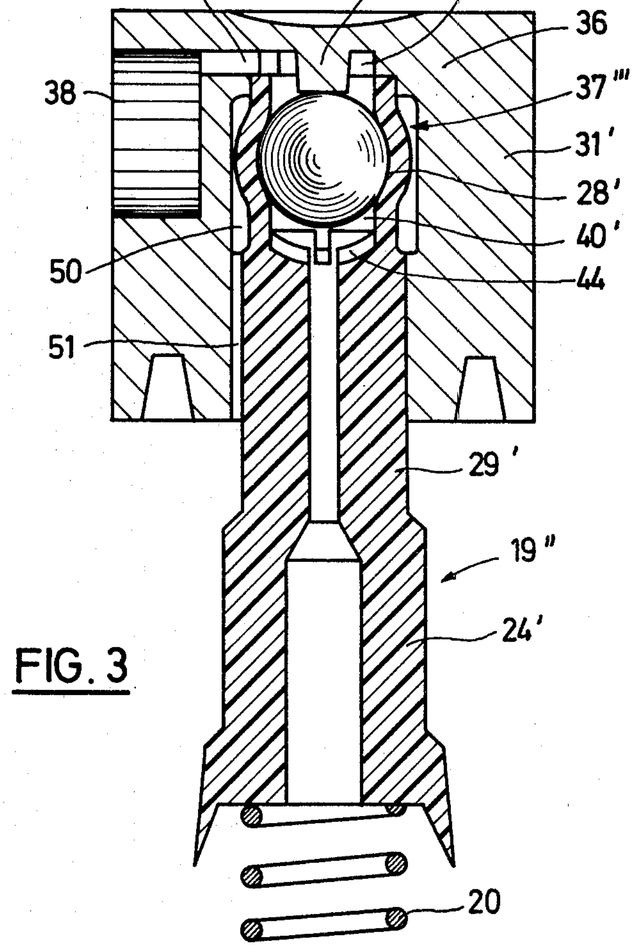

Numerous modifications of the preferred embodiment are possible, a few of which are shown in FIGS. 2 to 4. In FIG. 2, the compression spring 20' rests against the lower face of the piston 19' so that the valve body 36 which is also spherical is not loaded by it. The valve body lies in a valve chamber 40 which is defined at one end by the shoulder 33 of the stop 32 and at the other end by projecting cams 41 beneath the valve body 36 in the piston cavity 25'. Due to the elasticity of the piston, it is possible to press the valve body into this valve chamber. The projections 41 do not have to absorb significant forces since the valve body does not have an inherent tendency to shift toward the pump chamber.

In the embodiment according to FIG. 3, the spring 20' rests on the piston 19'', which passes without interposition of the outlet valve from a thick-walled portion 24' into a shaft 29'. The shaft 29' is clamped in an actuating push button 31' and has, above its clamped portion, a widenable portion 28' which is of a correspondingly thin-walled design. One end of the portion 28' rests inside a chamber 43 which communicates with a passage 42 in the actuating push button. The piston can thus be fixed in the longitudinal direction during mounting. Inside the widenable portion 28' is a valve chamber 40' which is formed by an enlarged cavity which is open at the top in the piston shaft, into which the spherical valve body 36 is pressed. The valve chamber 40' is bounded at its end nearer the pump chamber by a stop 44 which corresponds to the stop 32 of FIG. 1. Upward movement of the valve body can be prevented by a projection 45 in the actuating push button forming a stop. The chamber 43 communicates with the atomisation nozzle 38 and it should be noted that the outlet valve 37'' can be arranged particularly close to the atomisation nozzle 38. Nevertheless, the advantage that the elastic piston material is also used for forming the outlet valve 37'' is maintained even though an independent arrangement would also be possible. In order to prevent the pressure in front of the atomisation nozzle from reacting on the outlet valve, the chamber 50 surrounding the outlet valve 37'' communicates via a channel 51 with the atmosphere (via the air compensating channels).

FIG. 4 shows an embodiment in which a piston 19''' contains an elastic portion 28' in which is arranged a barrel-shaped valve body 36', i.e. a body having an arcuate circumferential surface and circular upper and lower ends. In this embodiment, in which the compression spring 20'' rests against the lower end of the valve body, it is possible to create a relatively large surface of contact between the valve body 36' and portion 28'' without the periphery of the valve body becoming too large. Cross-shaped grooves 46 are formed in the ends of the valve body 36' and form liquid channels. The embodiment of FIG. 4 operates in the same manner as the one illustrated in FIG. 1.

We claim:

1. A spray pump for liquid in a reservoir, of the type having a pump cylinder defining a pump chamber, a piston movable in the chamber to develop fluid pressure, an actuating pushbutton arranged to move the piston axially in the chamber, an atomization nozzle arranged to receive the liquid from the chamber, and a liquid outlet valve located between the pump chamber and the atomization nozzle, the spray pump adapted to force liquid along a flowpath from the pump chamber to the nozzle when the piston moves in a first direction and to draw liquid from the reservoir into the chamber when the piston moves in a second, opposite direction, the outlet valve comprising:

a valve body having an arcuate circumferential sealing surface;

a tubular member defining at least a part of the flowpath and having a resilient portion of substantially uniform cross-section for receiving the valve body, the resilient portion being radially deformed into a bulge, along its length, by the arcuate circumferential sealing surface of the valve body, the resilient portion thereby having an inner counter-sealing surface of arcuate form, the sealing and counter-sealing surfaces closing the flowpath when the piston moves in the second direction, the bulge of the resilient portion being further radially deformed and enlarged, along its length, by fluid pressure when the piston moves in the first direction, separating the sealing and counter-sealing surfaces, and opening the flowpath; and, a stop for holding the valve body against axial movement in the tubular member during movement of the piston in the first direction.

2. A pump according to claim 1, wherein the valve body is a sphere.

3. A pump according to claim 1, wherein the stop has a shoulder adjacent the tubular member, which shoulder contains at least one liquid duct.

4. A pump according to claim 1, wherein the tubular member also operates to transmit a force between the actuating push button and the piston.

5. A pump according to claim 4, wherein the force is an axial force caused by liquid pressure.

6. A pump according to claim 1, wherein the tubular member is an integral part of the piston, the piston being hollow and defining a cavity in which the valve body is arranged.

7. A pump according to claim 6, wherein the tubular member is a wall in the piston which is thinner so as to be radially deformable under fluid pressure in the region of the resilient portion, and thicker elsewhere to transmit axial force without deformation.

8. A pump according to claim 1, comprising means for urging the valve body resiliently against the stop.

9. A pump according to claim 8, wherein the urging means is a restoring spring arranged in the pump chamber and resting against the valve body.

10. A pump according to claim 9, wherein the restoring spring has a portion of smaller diameter penetrating into the piston.

11. A pump according to claim 17, wherein the piston has a shaft integral therewith which is pressed into an opening in the actuating push button.

12. A pump according to claim 11, wherein the valve body is arranged closely adjacent the region where the shaft is clamped in the actuating push button.

13. A pump according to claim 1, wherein the piston has a cavity therein and is provided with a sealing lip in sealing engagement with the pump cylinder, the valve body being arranged at a substantial distance downstream from the sealing lip of the piston, the liquid outlet valve operating independently of the sealing lip.

14. A pump according to claim 13, wherein the liquid outlet valve is arranged closely adjacent the atomization nozzle.

* * * * *

UNITED STATES PATENT AND TRADEMARK OFFICE
CERTIFICATE OF CORRECTION

PATENT NO. : 4,344,744

DATED : August 17, 1982

INVENTOR(S) : Wilhelm Schuster and Jurgen Stahl

It is certified that error appears in the above-identified patent and that said Letters Patent are hereby corrected as shown below:

On The Title Page,
In the Abstract, lines 9 and 10, "which tubular" should read --which the tubular--.

Column 8, line 4, "claim 17" should read --claim 1--.

Signed and Sealed this

*Twenty-sixth* Day of *October 1982*

[SEAL]

*Attest:*

GERALD J. MOSSINGHOFF

*Attesting Officer* *Commissioner of Patents and Trademarks*